United States Patent [19]

Shekleton

[11] Patent Number: 4,926,630
[45] Date of Patent: May 22, 1990

[54] JET AIR COOLED TURBINE SHROUD FOR IMPROVED SWIRL COOLING AND MIXING

[75] Inventor: Jack R. Shekleton, San Diego, Calif.

[73] Assignee: Sundstrand Corporation, Rockford, Ill.

[21] Appl. No.: 283,071

[22] Filed: Dec. 12, 1988

[51] Int. Cl.$^5$ .............................. F23R 3/16; F23R 3/54
[52] U.S. Cl. ...................... 60/39.36; 60/758; 60/760
[58] Field of Search ............... 60/39.36, 39.75, 39.83, 60/758, 759, 760

[56] References Cited

U.S. PATENT DOCUMENTS

| | | | |
|---|---|---|---|
| 3,608,310 | 9/1971 | Vaught | 60/752 |
| 3,613,360 | 10/1971 | Howes | 60/39.36 |
| 3,623,318 | 11/1971 | Shank | 60/39.36 |
| 4,314,443 | 2/1982 | Barbeau | 60/39.36 |
| 4,339,925 | 7/1982 | Eggmann et al. | 60/760 |
| 4,794,754 | 1/1989 | Shekleton | 60/760 |
| 4,800,717 | 1/1989 | Rodgers | 60/39.36 |

Primary Examiner—Louis J. Casaregola
Assistant Examiner—Timothy S. Thorpe
Attorney, Agent, or Firm—Wood, Dalton, Phillips, Mason & Rowe

[57] ABSTRACT

Warping of the rear turbine shroud 54 and the resulting cracking of turbine nozzle vanes 24 may be eliminated in a radial inflow turbine having an annular combustor 30 with a radially outer wall 32 opening on a compressed air plenum 48 by locating a plurality of tubes 70 on the radially outer wall 32 in fluid communication with the plenum 48 and extending the tubes 70 inwardly so that the radially inner ends 76 are adjacent the radially outer edge 56 of the turbine shroud 54. The tubes 70 thus direct sweeping streams of cooling air along the rear turbine shroud 54 to cool the same and prevent warpage.

10 Claims, 1 Drawing Sheet

JET AIR COOLED TURBINE SHROUD FOR IMPROVED SWIRL COOLING AND MIXING

FIELD OF THE INVENTION

This invention relates to turbine engines, and more particularly, to improvements in radial inflow turbine engines.

BACKGROUND OF THE INVENTION

It has long been recognized that the operational efficiency of a variety of engines, including turbines, can be increased by increasing the temperature at which they operate. Thus, every effort is made, within practical limits, to increase such temperatures. However, as is the case with a large variety of efforts towards improvement in untold numbers of fields of endeavor, various trade-offs must be made.

That is to say, while substantial increases in operating temperatures of engines can be achieved through the use of exotic materials capable of withstanding those temperatures, such a realization of improved operating efficiency may be of little practical value where the cost of the exotic materials is such as to make their employment impractical from the economic standpoint. Consequently, lower cost materials less capable of withstanding high temperatures are frequently employed and the temperatures reduced even though this may mean a greater consumption of fuel and/or a shorter engine life.

Achieving increased operational temperatures for turbine engines is particularly difficult in turbine engines of the so-called "monorotor" type. Engines of this type typically include an essentially one-piece rotor with one side defining a radial outflow compressor and the opposite side defining a radial inflow turbine wheel. This construction is extremely compact in that the cooling effect of air on the compressor side readily absorbs heat through the rotor that is applied to the same on the turbine side, allowing the use of higher operating temperatures. However, other, non-rotor parts of the engine, are subject to various problems as a consequence of this type of construction. For example, the rear engine shroud, which typically supports the turbine nozzle blades along with the front turbine shroud is always subjected to hot gases, either on the combustor side thereof or on the turbine wheel side thereof, or both. In contrast, the front engine shroud is subjected to relatively cool gas exiting from the compressor and, of course, the interconnecting vanes of the turbine nozzle conduct substantial heat to both.

In any event, while the front turbine shroud and at least those ends of the vanes in thermal conductive relation therewith run relatively cool, the rear engine shroud does not, which results in warping. As a consequence, the turbine nozzle blades may crack and shroud burnouts occur with undesirably high frequency.

The present invention is directed to overcoming one or more of the above problems.

SUMMARY OF THE INVENTION

It is a principal object of the invention to provide a new and improved cooling means for a turbine engine. More specifically, it is an object of the invention to provide a new and improved cooling means for the rear turbine shroud of a radial inflow turbine engine.

An exemplary embodiment of the invention achieves the foregoing object in a construction having rotor rotatable about an axis and provided with a compressor section having a compressed air outlet and a turbine wheel section. An annular combustor is disposed about the turbine wheel section and includes spaced radially inner and outer walls connected at one end by a radially directed wall, the opposite end defining a hot gas outlet. A rear turbine wheel shroud is in adjacency to the turbine wheel at the radially inner side of the hot gas outlet and extends toward the radially outer wall for confining hot gases of combustion against the turbine wheel. A turbine nozzle is disposed in fluid communication with the hot gas outlet and is connected to the rear turbine shroud near the radially outer edge thereof for directing hot gases of combustion from the combustor against the turbine wheel to drive the same.

According to the invention, nozzle means in fluid communication with the compressed air outlet are provided and have a plurality of discharge openings adjacent the rear turbine shroud for directing sweeping streams of cooling air along the rear turbine shroud on the combustor side thereof.

In a preferred embodiment of the invention, the discharge openings are defined by the open ends of tubes. The invention contemplates that the tubes be circumferentially spaced and mounted on and extend through the radially outer wall of the combustor.

In a highly preferred embodiment, the tubes extend across the hot gas outlet at least almost to the turbine nozzle or shroud radially outer edge to direct compressed air against the rear turbine shroud to cool the same.

In an optimum version of the invention according to this embodiment, the tubes extend in a direction that is generally tangential to the rear turbine shroud.

In addition, the tubes are preferably located to the combustor side of the rear turbine nozzle or shroud's radially outer edge and are angled axially toward the rear turbine shroud. In this embodiment, in its optimum form, the tubes are at about a 15° angle to a plane transverse to the axis of the rotor.

The invention contemplates that the shroud be curved in section and extend radially inward from the rear turbine shroud's outer edge with an increasing axially directed component to a generally axially directed radially inner edge and that the tubes discharge in adjacency to the outer edge to generate sweeping streams of cooling air intermediate the edges.

Typically, an annular, compressed air manifold connected to the compressed air outlet of the compressor surrounds the combustor.

It is also contemplated that the tubes have radially outer ends just radially outwardly of the radially outer wall and that such radially outer ends be flared.

Other objects and advantages will become apparent from the following specification taken in connection with the accompanying drawings.

DESCRIPTION OF THE PREFERRED EMBODIMENT

Figure 1:
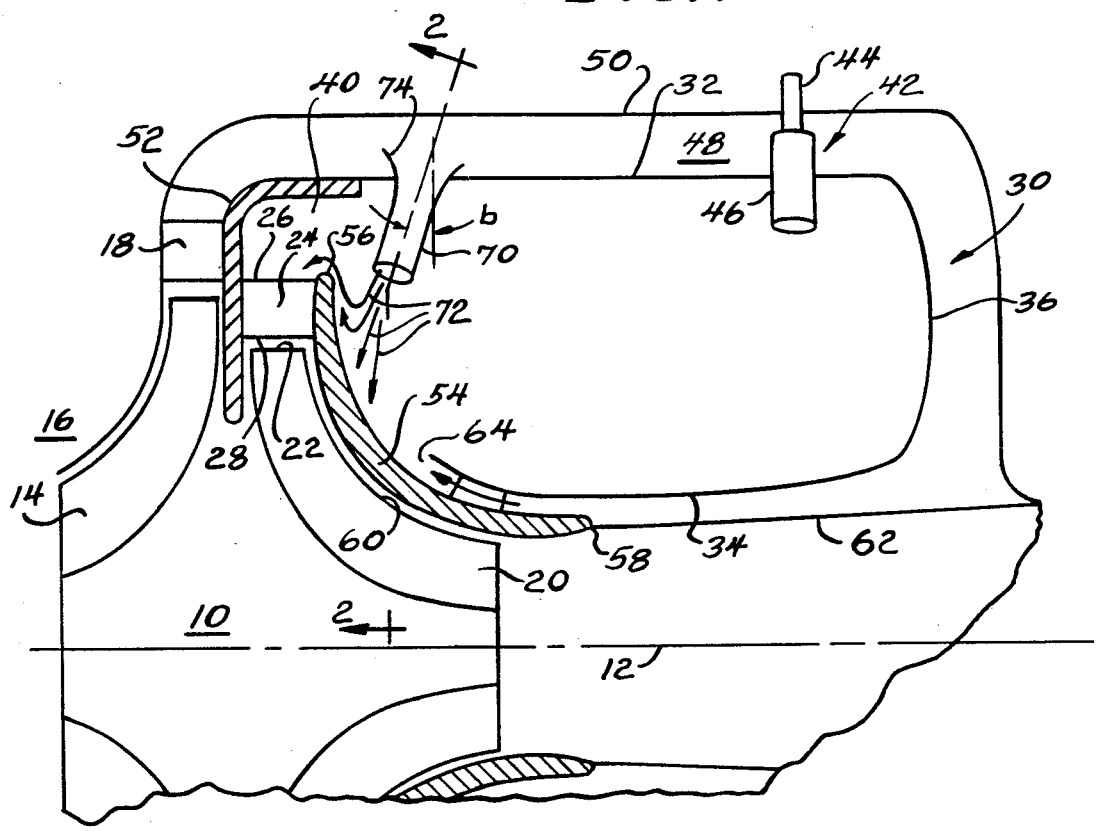
FIG. 1 is a somewhat schematic, fragmentary sectional view of a turbine engine made according to the invention.

An exemplary embodiment of a turbine engine made according to the invention is illustrated in the drawings in the specific form of a radial inflow turbine of a so-called "monorotor" type. However, it is to be understood that the invention is applicable to other forms of radial inflow turbines wherever improved rear turbine wheel shroud cooling is desirable.

Referring to FIG. 1, the turbine includes a rotor, generally designated 10, which is journaled by bearings (not shown) for rotation about an axis 12. On one side, the rotor 10 includes a series of compressor blades 14 which are operable to receive air from an inlet area 16 and compress the same and deliver the compressed air to a diffuser 18 of conventional construction. As will be appreciated by those skilled in the art, the compressor blades 14 define a radial outflow rotary compressor.

The opposite end of the rotor 10 is a turbine wheel section and includes a plurality of turbine blades 20. The turbine blades 20 define a radial inflow turbine wheel. Hot gases of combustion are directed against the radially outer edges 22 of the turbine blades 20 to drive the same and thus drive the rotor 10 about the axis 12.

Just radially outwardly of the edges 22 of the turbine blades 20 is an annular nozzle made up of a plurality of nozzle blades or vanes 24. The vanes 24 have inlet or leading edges 26 as well as trailing edges 28.

The turbine also includes a combustor, generally designated 30. The combustor 30 is an annular combustor and to that end includes a radially outer wall 32 that is concentric with the axis 12, a radially inner wall 34 that is also concentric with the axis 12, and a radially extending end wall 36. The end wall 36 interconnects the walls 32 and 34. The end 40 of the combustor 30 opposite the end wall 36 is an outlet for hot gases of combustion resulting from combustion within the combustor 30.

In the illustrated embodiment of the invention, a plurality of fuel injectors, each generally designated 42, are provided. They are located at circumferentially spaced locations and are intended to direct fuel and primary combustion air into the annular combustor 30 in a generally tangential direction. To this end, a fuel tube 44 may be utilized for introducing fuel into the combustor 30 and a surrounding air tube 46 may be disposed about the fuel tube 44. The latter extends to a source of fuel under pressure while the air tube 46 extends just outside of the radially outer wall 32 to open into a compressed air plenum 48. The compressed air plenum 48 is defined by a plenum wall 50 in surrounding relation to the radially outer wall 32 and the radial wall 36. The wall 50 extends to the diffuser 18.

The turbine includes a front shroud 52 which separates the compressor and turbine sections of the rotor 10 and in addition, together with the wall 50, serves as an inlet to the plenum 48. As can be readily appreciated, one function of the shroud 52 is to turn axially flowing gases of combustion at the outlet 40 radially inward through the nozzle vanes 24.

The turbine also includes a rear turbine wheel shroud 54. As can be seen in FIG. 1, the same is curved in section and has a generally radially directed, radially outer edge 56. As one progresses radially inwardly, an increasing axial component is given to the shape so that at the radially inner end 58, the shroud 54 is generally axially extending. The shroud 54 is in close adjacency to the peripheral edges 60 of the turbine blades 20 and serves to confine hot gases of combustion directed against the blades 20 by the nozzle 24 in the space between the blades so that maximum energy can be derived therefrom.

In most instances, the construction will include a radially inner plenum wall 62 which extends from the radially inner edge 58 of the rear turbine shroud 54 to the radially innermost part of the wall 50. The wall 62 is located radially inwardly of the wall 34 so that compressed air may flow almost entirely about the combustor 30 for cooling the walls 32, 34 and 36 thereof.

To provide some measure of cooling for the rear turbine shroud 54, the passageway defined by the walls 62 and 34 may terminate with a compressed air outlet 64 at a radially inner location on the shroud 54.

Figure 2:
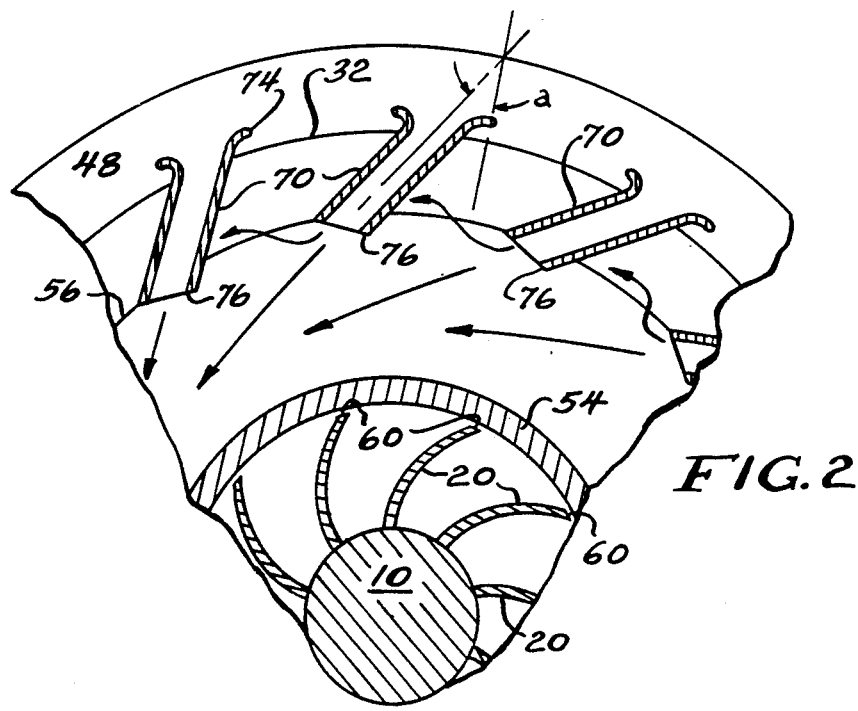
FIG. 2 is a sectional view taken approximately along the line 2—2 in FIG. 1.

According to the invention, the improved cooling of the rear turbine shroud 54 is achieved through the use of a plurality of nozzles 70 which direct sweeping streams of cooling air across the shroud 50 as illustrated by arrows 71. In a preferred embodiment of the invention, the nozzles 70 are defined by circumferentially spaced tubes 72 as best seen in FIG. 2. The tubes 72 are mounted on and extend through the radially outer wall 32 of the combustor and have open ends 74 within the manifold or plenum 48 to thus be in fluid communication with the outlet of the compressor section of the rotor 10.

Preferably, the ends 74 are somewhat flared as illustrated in the drawings so as to minimize losses in the compressed air stream resulting from the change of direction of air flow as the compressed air enters the tube 72.

The radially inner ends of the tubes 72 are designated 76 and as can be seen, extend inwardly at least to about the radially outer edge 56 of the rear turbine shroud 54. As can also be seen in FIG. 2, the nozzles or tubes 72 are disposed so as to be neither purely circumferentially or purely radially directed in a highly preferred embodiment. More particularly, they are directed generally tangentially to the shroud 54 in the preferred embodiment, the longitudinal axis of each tube is at an angle "a" to a radius extending from the axis 12 and that angle optimally will be on the order of about 45°. Where the construction is generally configured as illustrated, this will result in impingement of the cooling air stream emanating from each of the nozzles defined by the radially inner end 76 of the tube 72 impinging upon the shroud 54 in the vicinity of its point of connection to the trailing edge 28 of each of the nozzle vanes 24.

In addition, and as can best be appreciated from FIG. 1, the tubes 70 are not disposed in a radial plane. Rather, they are angled somewhat axially toward the shroud 54 from a point rearwardly or on the combustor side of the leading edge 50. Typically, an angle such as the angle "b" is employed in a highly preferred of the invention, the angle "b" is on the order of about 15°. It is, of course, necessary that the tubes 70 discharge cooling air in the same direction of swirl as the swirling gases within the combustor 30. That is to say, the tubes 70 should be opening in the same direction as the tubes 46. In addition, since the air exiting the diffuser 18 will also be swirling, the same direction of swirl should be chosen for both the tubes 46 and the tubes 70 so as to conserve energy.

As of consequence of this construction, an extremely high velocity stream of cooling air impinges upon the combustor side of the rear turbine shroud 54. Rather high "g" forces will be present so this cool air, after cooling the shroud 54 will rapidly centrifuge out and mix with the hot gases of combustion at the outlet 40 or downstream thereof as, for example, along the edges where the nozzle vanes 24 join to the shroud 54.

When an actual turbine made according to the invention was operated, it was found to readily withstand turbine inlet temperatures of over 2,000° F. with an over six percent increase in turbine efficiency at high speed attained.

It is to be particularly observed that penetration of the tubes 70 across the outlet 40 of the combustor 30 must be just sufficient so that the cooling air streams will be directed against the shroud 54. As inferred previously, this generally means that the ends 76 of the tubes 70 must extend at least inwardly to about the radial location of the radially outer 56 of the shroud 54 but this may vary in some instances.

It is also desirable that the length of the tubes 70 be such that relatively highly directionalized streams of air will result. That is to say, the tube lengths cannot be so short as to allow substantial diffusion to occur.

It should also be observed that very little concern need be given to the makeup of the tubes 70 since they are conducting cooling air and such cooling air will be sufficient to keep the tubes 70 themselves from deteriorating as the result of being disposed in the stream of hot gases exiting the combustor 30 through the outlet 40.

I claim:

1. A radial inflow turbine comprising:
   a rotor rotatable about an axis and having a compressor section having a compressed air outlet and a turbine wheel section;
   an annular combustor disposed about said turbine wheel section and including spaced radially inner and outer walls connected at one end by a radial directed wall, the opposite end defining a hot gas outlet;
   a rear turbine wheel shroud in adjacency to said turbine wheel at the radially inner side of said hot gas outlet and extending toward said radially outer wall for confining hot gases of combustion against said turbine wheel;
   a turbine nozzle in fluid communication with said hot gas outlet and connected to said rear turbine shroud near the radially outer edge thereof for directing hot gas of combustion from said combustor against said turbine wheel to drive the same; and
   a plurality of inwardly directed tubes disposed across said hot gas outlet and in fluid communication with said compressed air outlet and extending at least almost to said turbine shroud radially outer edge to direct compressed air against said rear turbine shroud to cool the same.

2. The radial inflow turbine of claim 1 wherein said tubes extend in a non-circumferential, non-radial direction.

3. The radial inflow turbine of claim 2 wherein said tubes extend in a direction generally tangential to said rear turbine shroud.

4. The radial inflow turbine of claim 1 wherein said tubes are to the combustor side of said rear turbine shroud radially outer edge and are angled axially toward said rear turbine shroud.

5. The radial inflow turbine of claim 4 wherein said tubes are at about a 15° angle to a plane transverse to the axis of said rotor.

6. The radial inflow turbine of claim 1 wherein said shroud is curved in section and extends radially inward from said rear turbine shroud outer edge with an increasing axially directed component to a generally axially directed radially inner edge and said tubes discharge in adjacency to said outer edge to generate sweeping streams of cooling air intermediate said edges.

7. A radial inflow turbine comprising:
   a rotor rotatable about an axis and having a compressor section having a compressed air outlet and a turbine wheel section;
   an annular combustor disposed about said turbine wheel section and including spaced radially inner and outer walls connected at one end by a radial directed wall, the opposite end defining a hot gas outlet;
   a rear turbine wheel at the radially inner side of said hot gas outlet and extending toward said radially outer wall for confining hot gases of combustion against said turbine wheel;
   a turbine nozzle in fluid communication with said hot gas outlet and connected to said rear turbine shroud near the radially outer edge thereof for directing hot gas of combustion from said combustor against said turbine wheel to drive the same; and
   nozzle means in fluid communication with said compressed air outlet and having a plurality of discharge openings adjacent said rear turbine shroud for directing a sweeping stream of cooling air along said rear turbine shroud on the combustor side thereof.

8. The radial inflow turbine of claim 7 wherein said discharge openings are defined by the ends of circumferentially spaced tubes mounted on and extending through said radially outer wall.

9. The radial inflow turbine of claim 8 further including an annular compressed air manifold connected to said compressed air outlet and surrounding said combustor.

10. The radial inflow turbine of claim 8 wherein said tubes have radially outer ends just radially outwardly of said radially outer wall and said radially outer ends are flared.

* * * * *